United States Patent [19]
Kaye

[11] 3,737,260
[45] June 5, 1973

[54] COUNTER FLOW GENKA HEAD

[76] Inventor: David Arnold Kaye, 10932-104th Avenue N., Largo, Fla. 33540

[22] Filed: Nov. 12, 1970

[21] Appl. No.: 88,632

[52] U.S. Cl...............................425/113, 42.5/131
[51] Int. Cl................................................B29f 3/10
[58] Field of Search...................18/13 H, 13 S, 13 T, 18/14 R, 14 G; 425/113, 114, 130, 131

[56] References Cited

UNITED STATES PATENTS

| | | | |
|---|---|---|---|
| 3,581,343 | 7/1971 | Henrikson et al. | 425/113 |
| 2,668,154 | 9/1954 | Huckfeldt | 425/460 |
| 3,054,143 | 9/1962 | Stenger | 425/464 |
| 3,549,735 | 12/1970 | Moss | 425/114 X |

Primary Examiner—J. Spencer Overholser
Assistant Examiner—Ben D. Tobor
Attorney—Sandoe, Hopgood & Calimafde

[57] ABSTRACT

This extruder for extruding plastic coverings over cores, or for extruding a mass of plastic having an annular cross-section and hollow interior, has passages to the extruder die correlated so that the plastic material around the entire circumference of the core travels for substantially the same length of flow path in reaching the outlet of the die. This avoids difference in pressure at different locations around the core and produces a uniform thickness of the extruded covering. The uniform length of flow passage leading to all parts of the core circumference is obtained by a combination of branch and different direction flow passages between the delivery from the extruder screw and the annular outlet of the die.

10 Claims, 7 Drawing Figures

PATENTED JUN 5 1973 3,737,260

INVENTOR
David Arnold Kaye
BY Sandoe, Hopgood & Calimafde.
ATTORNEYS.

COUNTER FLOW GENKA HEAD

BACKGROUND AND SUMMARY OF THE INVENTION

In conventional extruders, the plastic material is forced into the extruder cross-head under high pressure and travels through a passage to an annular outlet of the extruder die. If the plastic material is fed into the extruder cross-head from the top, then the lower part of the die outlet is further from the supply inlet than is the top part of the die outlet; and there is more pressure drop in the flow of the plastic material to the lower part of the die outlet. This results in greater pressure extruding the plastic material over the upper part of the core than over the lower part, the pressure becoming progressively lower around the sides of the core from top to bottom. More plastic is extruded where the pressure is higher and this makes covering eccentric and of non-uniform thickness.

It has been the practice of the prior art to give the die an eccentric relation to the core with the die opening narrower where the flow path for the plastic material is shorter and the die opening wider where there is more pressure drop in the material supplied to the die opening. The eccentricity of the die can be adjusted to compensate for differences in the flow path, but the problem has been that the compensation does not remain constant. For example, adjustments that will initially compensate for eccentricity of the extruded covering fail to do so as production progresses, predominantly because of varying compound temperatures and viscosity.

In practice, temperatures and viscosity cannot be kept constant and the eccentricity of coverings vary so much that it is not uncommon for the covering to fail to comply with production standards. This results in substantial scrap losses. A more serious problem is that it is often impossible to detect the extent of the eccentricity until it is too late to make compensatory die adjustments.

The object of this invention is to provide improved flow paths for the compound within the cross-head, thereby insuring that the velocity and pressure of the compound upon arriving at the opening in the extruded die is uniform about the circumference of the die opening. This produces coverings of uniform wall thickness about the core regardless of variations in temperature and viscosity of the extruded material.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF PREFERRED EMBODIMENT

Figure 1:
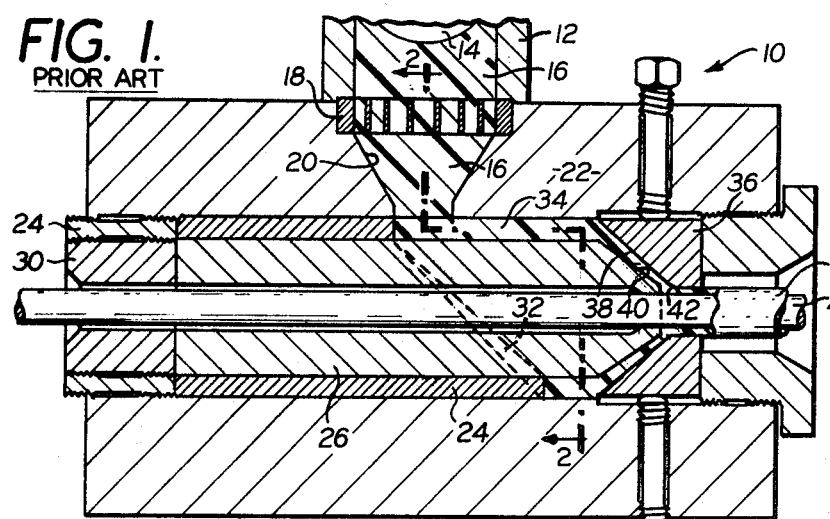
FIG. 1 is a sectional view through a conventional extruder of the prior art illustrating the problem to which the present invention is directed.

FIG. 1 shows an extruder 10 having a barrel 12 containing a conventional extruder delivery screw 14 which advances the plastic compound 16 through a strainer plate 18 at the delivery end of the barrel 12. Beyond the strainer plate 18, the material 16 passes through a passage 20 of a cross-head 22 which contains a helicoid 24 that surrounds a core guide 26. The helicoid 24 is held in the cross-head 22 by a retaining nut 28 threaded into the cross-head 22; and the core guide 26 is held in the helicoid by a retaining nut 30 threaded into the retaining nut 28.

Figure 2:
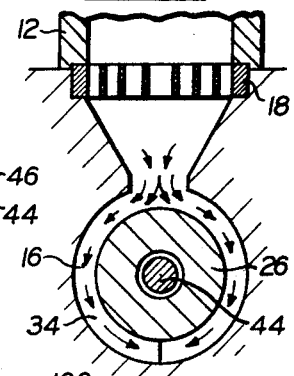
FIG. 2 is a sectional view taken on the line 2—2 of FIG. 1.

There is a shoulder 32 on the helicoid 24; and to the right of this shoulder, in FIG. 1, the diameter of the helicoid is less than the diameter of the opening through the cross-head in which the helicoid is positioned. This leaves an annular passage 34, best shown in FIG. 2, around which the plastic material 16 flows on its way to a die 36. The die 36 has a frustoconical end face 38 that confronts a frusto-conical end face 40 of the core guide 26. The angle of these faces is different so that the passage formed by the clearance between the faces 38 and 40 tapers to a narrow annular die outlet 42 where the core 44 comes through the end of the core guide 26. The diameter of the die is larger than that of the core 44 which it surrounds, the clearance being equal to the desired wall thickness of the cover 46 which is extruded over the core 44.

The construction thus far described is conventional and it will be apparent from an inspection of FIG. 1 that the flowpath for the material 16 which eventually reaches the lower part of the core 44 is much longer than the flowpath of the material which is extruded over the upper part of the core 44. This difference in flowpath results in a difference in pressure drop of the plastic material 16 being supplied to different regions of the extruder die outlet 42 and the difference in delivered pressure of the plastic from the die 42 results in a difference in velocity of discharge of the material 16 with a larger amount of material deposited on the upper part of the core 44 and progressively less material deposited on the core around the sides and toward the bottom of the core.

Figure 3:
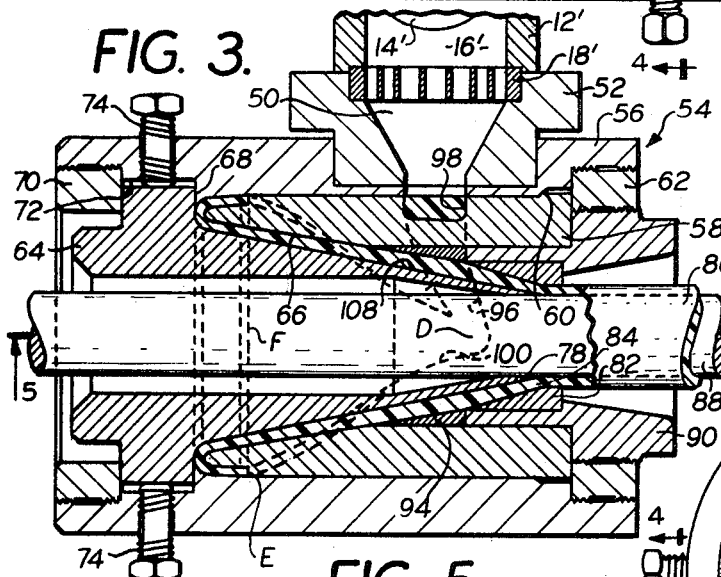
FIG. 3 is a sectional view corresponding to FIG. 1 but showing the improved construction of this invention.
Figure 6:
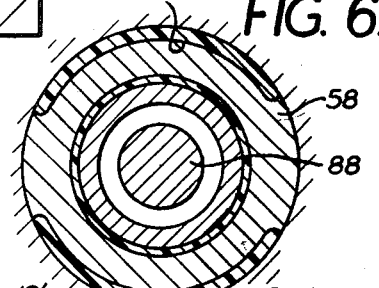
FIGS. 6 and 7 are sectional views taken on the lines 6—6 and 7—7, respectively, of FIG. 5.
Figure 4:
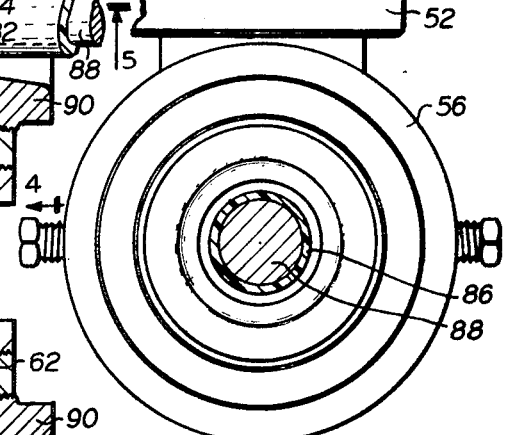
FIG. 4 is a sectional view taken on the line 4—4 of FIG. 3.

FIG. 3 shows a cross-head assembly made in accordance with this invention. It is supplied with plastic material under high pressure from an extruder barrel 12' containing an extruder delivery screw 14' that delivers plastic under high pressure through a strainer plate 18', these parts of the extruder being the same as in FIG. 1 and indicated by the same reference characters with a prime appended.

The material discharged through the strainer plate 18' enters a passage 50 in a fitting 52 which is threaded into a cross-head assembly 54. The cross-head assembly 54 includes a cross-head 56 and a helicoid 58 which fits into the cross-head 56 and against a shoulder 60. The helicoid 58 is held in place by a retaining nut 62 threaded into one end of the cross-head. A core guide 64 is inserted into the cross-head 56 from the other end and this core guide extends into the helicoid 58 with an annular clearance between a tapered face of the core guide 64 and a confronting tapered face 66 of the helicoid 58.

The core guide has a shoulder 68 which contacts with a complementary shoulder in the cross-head 56. The core guide is held against this shoulder 68 by a core guide retaining nut 70. The counterbore 72, in which the end of the core guide 64 is held, is of larger diameter than the corresponding part of the core guide and the concentricity of the core guide 64 in the counterbore 72 is adjusted by adjusting means 74 located at angularly spaced regions around the circumference of the cross-head 56.

The core guide 64 has a converging end portion 78 with a tapered outside face that confronts a corresponding frusto-conical face 80 of an extrusion die 82. The taper of the face 80 is different from the taper of the outside face of the end portion 78 of the core guide so as to form a constricting passage terminating in a die outlet 84 from which the material 16' is extruded as a cover 86 over the core 88.

The die 82 is held in place by a die retaining nut 90 which screws into the helicoid retaining nut 62. The retaining nut 90 has an annular extension 92 surrounding the circumference of the die 82 and this annular extension 92 retains a tapered filler element 94 in the helicoid 58. The filler 94 provides an extension of the inner face 66 of the helicoid 58.

Figure 7:
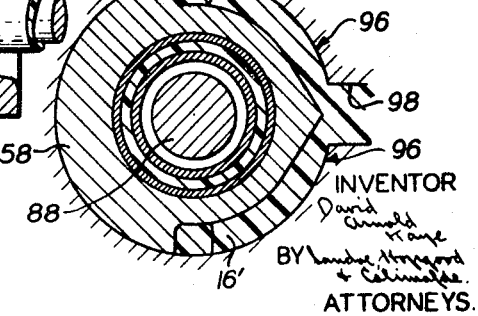

The helicoid 58 has two branch passages 96 which are formed by grooves in the outside surface of the helicoid. These grooves 96 meet at the upper side of the helicoid 58 to communicate with the passage 50 through which plastic material is supplied to the cross-head assembly. This meeting of the branch passages 96 into a common passage at the end of supply passage 50 is indicated in the drawing by the reference character 98. The way in which the common passage 98 divides to supply plastic material 16' around both sides of the helicoid 58 is shown clearly in FIG. 7. Each of the passages 96 extends substantially a quarter of the way around the helicoid 58 so that the passages 96 terminate on opposite sides of the helicoid as also shown in FIG. 7.

Figure 5:
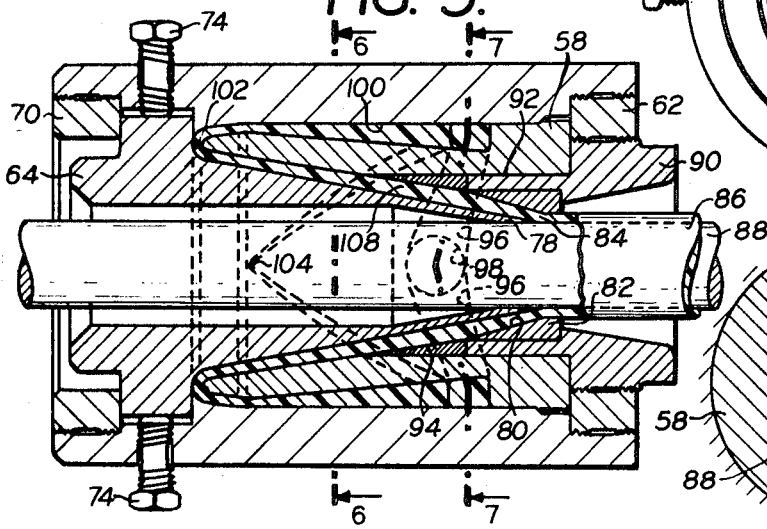
FIG. 5 is a sectional view taken on the line 5—5 of FIG. 3.

Referring to FIGS. 3 and 5, the passages 96 extend to the right in the drawing as they extend circumferentially around the helicoid 58, and these passages 96 have curved lower ends which meet passages 100 formed on both sides of the helicoid 58 by diverging grooves in the outside cylindrical surface of the helicoid 58. These passages 100 increase in circumferential width as they extend toward the left in FIG. 3, that is, in a direction counter to the eventual direction of discharge of the material 16 from the die 82. This increase in width of the passages 100 is shown clearly in FIG. 3.

In order to prevent excessive reduction in the velocity of the material as it passes through the passages 100, these passages decrease in radial width as they extend toward the left as clearly shown in FIG. 5. Thus the actual cross-section of the passages 100 need not change substantially throughout their length and this produces a more uniform rate of flow of the material.

The left hand end of the helicoid 58 is rounded, as shown in FIGS. 3 and 5 and this rounded end face of the helicoid confronts complementary rounded surfaces on the cross-head 56 and core guide 64 so as to provide substantially 180 degree turn passages 102 which are annular in extent; that is, they are all around the circumference of the end of the helicoid 58 and they comprise extensions of the annular passage which is formed by the coming together of the passages 100 which form a common annular passage after their individual circumferential extent exceeds 180°. The passages 100 come together at the point 104 on the far side of the cross-head assembly in FIG. 5 and at a corresponding point on the near side of the assembly ahead of the plane of section.

The plastic material after changing its direction of flow at the return passages 102 flows forward through an annular passage indicated by the reference character 108 and formed by an annular clearance between the core guide 64 and first the helicoid 58, then the tapered filler element 94 and finally the face 80 of the extruded die 82.

In the construction illustrated, the passage 108 increases somewhat in radial width to compensate for its decrease in circumferential width as it converges toward the core 88. At the die 82, the passage for the plastic compound decreases in cross-section to provide a covering of the desired thickness. The die 82 is replaced by other dies which produce die openings of different radial width depending upon the desired covering thickness, in accordance with conventional practice.

In the preferred construction, the cross-sectional area through which the compound flows is preferably constant throughout the flow path and by maintaining constant or substantially constant cross-sections of the compound as it flows through the cross-head assembly, the velocity of flow is very nearly constant. Pressure drop due to frictional resistance to flow is likewise very nearly a constant, thus insuring that the compound velocity upon arriving at the die 82 is very nearly uniform about the circumference of the die thus producing a substantially perfectly concentric covering around the core.

It will be apparent that the correlation of the passages of the flow path of this invention reduce the variation in length of flow path to a minimum. For example, the distance from point D in FIG. 3 to point E and then by the reverse direction in flow to the forming die 82 is the maximum length of flow path. The distance from the point D to the point F in FIG. 3 represents the minimum length of flow path. The influence of path length on flow rate is proportional to the ratio of the length of the paths involved. If both paths are relatively long, the influence of flow rate resulting from the difference in length diminishes as the overall length of the path increases.

It would be a relatively simple matter to increase the length of the flow path shown in the drawing by increasing the length of the assembly, but the proportions illustrated result in so little difference in flow path that the velocities at the die outlet are substantially uniform around the circumference of the core and the eccentricity, if any, remains always well within acceptable limits.

One feature of the invention by which long flow paths are obtained without resorting to excessive lengths of cross-head assembly is the use of the branch passages extending circumferentially around different sides of the helicoid, and the use of passages extending lengthwise along the helicoid for most of its longitudinal length in a direction counter to the direction of movement of the core so that the movement back along this distance towards the die outlet provides a substantial length much greater than the length of the helicoid. In the construction illustrated the total length of the flow passage is substantially twice the length of the helicoid.

There are sometimes imperfections inadvertently incorporated in the components of a cross-head during manufacture. This may affect the flow of the plastic compound 16' along the flow path. The effect of these imperfections can be compensated by adjusting the screws 74 to offset the core guide 64 to some extent with respect to the confronting face of the helicoid 58. This adjustment of the core guide increases the cross-section of the flow path on one side and reduces it on the other and can be used to compensate imperfections in the parts of the assembly which result in eccentricity of the coating 86.

The preferred embodiment of the invention has been illustrated and described but changes and modifications can be made and some features can be used in different combinations without departing from the invention as defined in the claims.

What is claimed is:

1. An extruder cross-head assembly for extruding a jacket or cover around a traveling core including in combination a guide through which the core passes, a supply passage through which covering material is supplied to the cross-head assembly at high temperature and pressure, branch passage leading from the supply passage circumferentially to locations on opposite sides of the core guide, a longitudinally extending passage having separate parts communicating with the branch passages at said locations, said longitudinally extending passage extending first rearwardly counter to the direction of movement of the core and then forwardly in the direction of movement of the core, the separate parts of said longitudinally extending passage diverging to greater circumferential angular width as they extend away from said branch passages and eventually combining with one another to surround the full circumferential angular extent of the core guide, and a die into the longitudinally extending passage discharges covering material at substantially uniform velocity around the circumferential extent of the traveling core.

2. The extruder cross-head assembly described in claim 1 characterized by each of said separate parts of the longitudinally extending passage diverging to a circumferential extent of 180° so that they meet and embrace a 360° extent of discharge for the covering material within the distance that said separate parts of the passage extend in directions counter to the direction of movement of the core.

3. The extruder cross-head assembly described in claim 1 characterized by the branch passages extending in directions that have a component which is parallel to the direction of movement to the core through the cross-head assembly.

4. The extruder cross-head assembly described in claim 1 characterized by the cross-head assembly including a cross-head, a helicoid within the cross-head and surrounding the core guide, the branch passages having grooves in the helicoid that are closed along most of their length by overlying surfaces of the cross-head, the supply passage opening through the cross-head into communication with the branch passages where they come together.

5. The extruder cross-head assembly described in claim 1 characterized by the sum of the cross sections of the branch passages, the combined cross sections of the separate parts of the longitudinally extending passages, and the rest of the longitudinally extending passage to the region of an extrusion die being the same cross-section so that the velocity of the coating material and the pressure drop therein is substantially uniform throughout the flow path of the coating material through the cross-head assembly.

6. The cross-head assembly described in claim 5 characterized by the radial depth and circumferential width of the various portions of the passages varying oppositely to maintain the cross-sections of the flow path substantially equal along the full length thereof from the supply passage to the entrance into the extruder die.

7. The extruder cross-head assembly described in claim 1 characterized by the cross-head assembly including a helicoid with surfaces that form part of the wall of the branch passages and the longitudinally extending passage throughout most of the length of said passages, the length of the flow passages for the coating material being greater than the length of the helicoid in a direction parallel to the direction of movement of the core.

8. The extruder cross-head assembly described in claim 7 characterized by the branch passages and the portion of the longitudinally extending passage that extends in a direction counter to the direction of movement of the core being grooves in the outside surface of the helicoid, and the portion of the longitudinally extending passage that extends in the direction of the movement of the core being formed by a clearance between the helicoid and the core guide, the combined length of either of the branch passages and the longitudinally extending passage being more than twice as long as the helicoid in the direction of movement of the core.

9. The extruder cross-head assembly described in claim 1 including a cross-head having a bore opening therethrough and longitudinally thereof, a helicoid that fits within the bore and that itself has a longitudinal bore extending therethrough, the core guide having an outside surface that confronts the wall of the bore through the helicoid, grooves in the outside surface of the helicoid forming with other overlying surface areas of the cross-head the separate parts of the longitudinally extending passage that extend in a direction counter to the direction of movement of the core, the limit of extent of the helicoid in a direction counter to the direction of movement of the core being spaced from the cross-head and from one end of the core guide around the full circumference of the helicoid to provide an annular portion of the longitudinally extending passage, a portion of the passage that curves from a rearwardly extending direction to a forwardly extending position, the helicoid having an underside surface spaced from the core guide and providing a portion of the forwardly extending length of the longitudinally extending passage, and an extruder die confronting the other end of the core guide and having clearance from the die through which coating material is extruded over the traveling core.

10. The extruder cross-head assembly described in claim 9 characterized by a counter bore in the cross-head that holds a part of the core guide that is remote from the die end of the core guide, the counter bore having an inside diameter larger than the outside diameter of an adjacent part of the core guide, and adjusting screws at angularly spaced locations around the counter bore and threaded through the cross-head into contact with the core guide for adjusting the alignment of the core guide with respect to the helicoid to alter the clearance between the confronting faces of the helicoid and the core guide and the resulting radial depth of the longitudinally extending passage on the different sides thereof.

* * * * *